United States Patent [19]

King

[11] Patent Number: 5,707,284
[45] Date of Patent: Jan. 13, 1998

[54] SCREEN SETTER FOR COMBINE

[76] Inventor: Frederick J. King, P.O. Box 90, Elgin, Manitoba, Canada

[21] Appl. No.: 588,025

[22] Filed: Jan. 17, 1996

[30] Foreign Application Priority Data

Jan. 24, 1995 [CA] Canada ................. 2140945

[51] Int. Cl.$^6$ .......................................... A01F 12/32
[52] U.S. Cl. ............................. 460/102; 460/109
[58] Field of Search ....................... 460/102, 101, 460/108, 109, 119

[56] References Cited

U.S. PATENT DOCUMENTS

| | | | |
|---|---|---|---|
| 624,333 | 5/1899 | Hixson . | |
| 698,258 | 4/1902 | Closz | 209/394 |
| 789,966 | 5/1905 | Ditch et al. | 209/394 |
| 841,857 | 1/1907 | Garlits et al. | 209/394 |
| 1,248,686 | 12/1917 | Lindh | 209/394 |
| 1,462,804 | 7/1923 | Evans . | |
| 2,011,365 | 8/1935 | Kuballe | 209/394 |
| 2,253,296 | 8/1941 | Holtzman | 209/394 |
| 2,423,026 | 6/1947 | Holtzman | 209/394 |
| 2,732,941 | 1/1956 | Deiss | 460/102 X |
| 3,472,378 | 10/1969 | Payne | 209/394 |
| 4,258,726 | 3/1981 | Glaser et al. | 460/109 |
| 4,425,925 | 1/1984 | Kersting et al. | 460/101 X |
| 4,712,568 | 12/1987 | Strong et al. | 130/272 |
| 4,897,072 | 1/1990 | Bestland | 460/99 |

FOREIGN PATENT DOCUMENTS

| | | |
|---|---|---|
| 534027 | 12/1956 | Canada . |
| 1225899 | 8/1987 | Canada . |
| 1283831 | 5/1991 | Canada . |

*Primary Examiner*—Terry Lee Melius
*Attorney, Agent, or Firm*—Heslin & Rothenberg, P.C.

[57] ABSTRACT

Apparatus is disclosed for the simultaneous adjustment and setting of a pair of combine screens. A tie bar arrangement is provided, interconnecting at least a pair of side-by-side sieve screens. An operating handle is pivotally mounted to the frame and is pivotally connected to the tie bars and extends outwardly of the apparatus for ease of use. A scale or gauge is provided to indicate the amount of handle movement and therefore, screen opening.

7 Claims, 4 Drawing Sheets

SCREEN SETTER FOR COMBINE

FIELD OF THE INVENTION

This invention relates to cleaning screens or sieves in combines. Specifically the invention relates to apparatus for adjusting such screens.

BACKGROUND OF THE INVENTION

It has been known for some time to adjust the openings in combine screens. When a farmer begins to combine a given crop, he will often have to stop the machine to make adjustments, particularly going from one crop to another. The conventional process of individual screen adjustment can be a very awkward one if the combine is the type that uses two or more, side-by-side screens. One screen might be properly set but the other screen or screens may be improperly set.

Some combines have two or more side-by-side screens or sieves as they are sometimes called. These may be located in the final screening process of the machine which separates a valuable crop from the non-usable residue or dockage. If a screen is set too widely, the crop becomes contaminated with dockage that reduces the payback at the grain elevator when the crop is delivered. On the other hand, if the screen is set too narrowly, valuable crop ends up out through the back of the combine and onto the ground where it cannot be recovered. As most farmers have only one combine, the setting of the screens requires adjustment each time he moves to a different field on which a different crop is being harvested. For example, wheat will have a different size head than oats which will have a different size head in return from flax or rapeseed. When the farmer begins combining a given crop he will often stop the combine to check that his settings are correct and that he is not either contaminating his crop or loosing his crop out the back end.

The apparatus according to the present invention provides a solution to the above mentioned problems and gives the farmer means to simultaneously adjust at least two side-by-side screens in a combine. Several patents from the prior art disclose various forms of screen adjustment. Examples of the prior art are shown in the following specifications:

| U.S. Pat. No. 624,333 | Hixson | 02/05/1899 |
| U.S. Pat. No. 2,253,296 | Holtzman | 19/08/1941 |
| U.S. Pat. No. 3,472,378 | Payne | 14/10/1969 |
| U.S. Pat. No. 4,712,568 | Strong et al | 15/12/1987 |
| U.S. Pat. No. 4,897,072 | Bestland | 30/01/1990. |

All of the above references show various arrangements for sieves or screens in a harvesting machine and which incorporate an adjustment mechanism that is capable of altering the size in the openings in the screens.

SUMMARY OF THE INVENTION

The present invention addresses the problems of adjusting sieves in a combine where two or more sieves in side-by-side relation, require such adjustment. The present invention addresses the complicated manual adjustment of two screens that has no preset adjustment for guidelines etc. where the farmer has to adjust the screens blindly with the hope that all of the screens are set to the same size. In accordance with the present invention, the farmer can, in a single motion and along a calibrated scale, set a plurality of screens simultaneously to the same setting.

According to a broad aspect, the invention relates to apparatus for simultaneously adjusting a plurality of side-by-side screens in a combine, the screens being frame mounted and movable between open and closed positions. The apparatus comprises an operating handle that is pivotally mounted to the frame and which extends outwardly of the cleaning area of the combine. At least a pair of spaced, screen connecting arms, one secured to each screen, are provided together with a plurality of tie bars which pivotally interconnect the free ends of the connecting arms with the operating handle. Thus, movement of the handle effects simultaneous movement of all of the screens.

The apparatus may include a graduation scale associated with the handle to provide an indication of the amount of screen movement relative to the handle movement.

BRIEF DESCRIPTION OF THE DRAWINGS

The invention is illustrated, by way of example, in the accompanying drawings in which.

BRIEF DESCRIPTION OF THE PREFERRED EMBODIMENT

As described earlier, combines that have two or more screens or sieves have a complicated manual method of adjustment in that each screen must be adjusted separately from the others and there are no preset adjustments for guidelines and the like so that the operator has to blindly adjust the screens hoping that both are set to substantially the same opening. This is most important when an operator has a setting for one crop and then has to move the combine to another field to harvest a different crop that requires a different setting. He then must go through the independent adjustment of both screens again.

Figure 1:
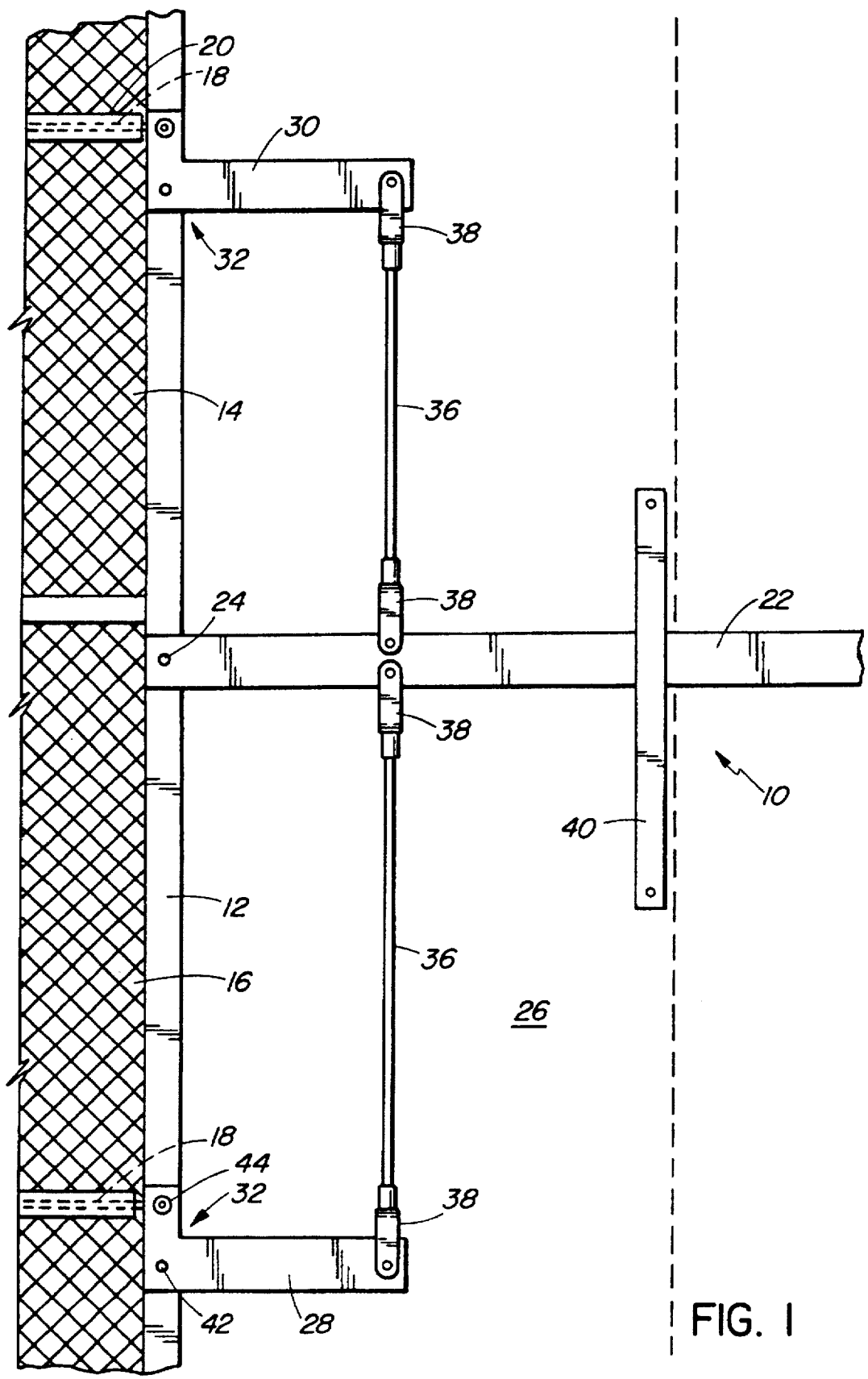
FIG. 1 is a plan view showing the apparatus according to the invention attached to a pair of combine screens.
Figure 2:
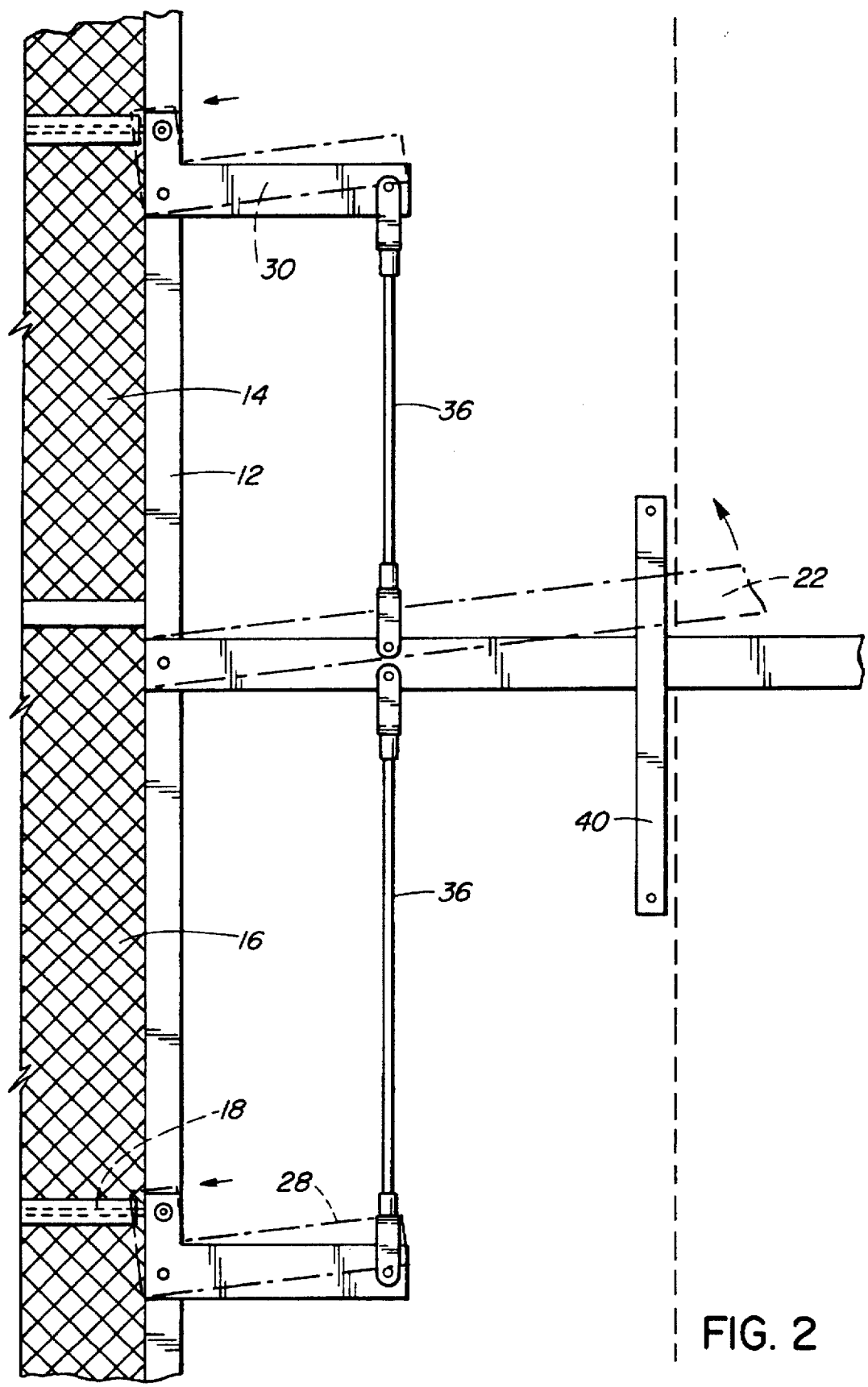
FIG. 2 is a view similar to FIG. 1 but showing the apparatus adjusted to another position in phantom.

Turning now to FIGS. 1 and 2 of the drawings the apparatus according to the invention is illustrated generally at 10 and is adapted to be attached to a frame 12 incorporating two or more screens 14 and 16, mounted in a combine, not shown.

Combine operators are well aware of the operation of the screens. As with most manufactured screens, a plurality of small diameter shafts extend transversely of the screens and they interconnect a series of slats (sometimes corrugated) and the small diameter shafts interact with a wave-shaped actuator 18 which would lie within channels 20 shown in FIGS. 1 and 2. By moving the actuator in or out and securing it in place, the screen slats are opened or closed accordingly to change the size of the openings therein.

In the present invention, the apparatus is mounted onto the screen frame 12 and is adapted to simultaneously adjust at least a pair of side-by-side screens 14 and 16 between open and closed positions. As illustrated, the apparatus 10 incorporates an operating handle 22 which is pivotally mounted at 24 to the screen frame 12 and the handle extends outwardly of the cleaning area 26 of the combine so as to be in a position for easy manipulation by the combine operator.

Figure 3:
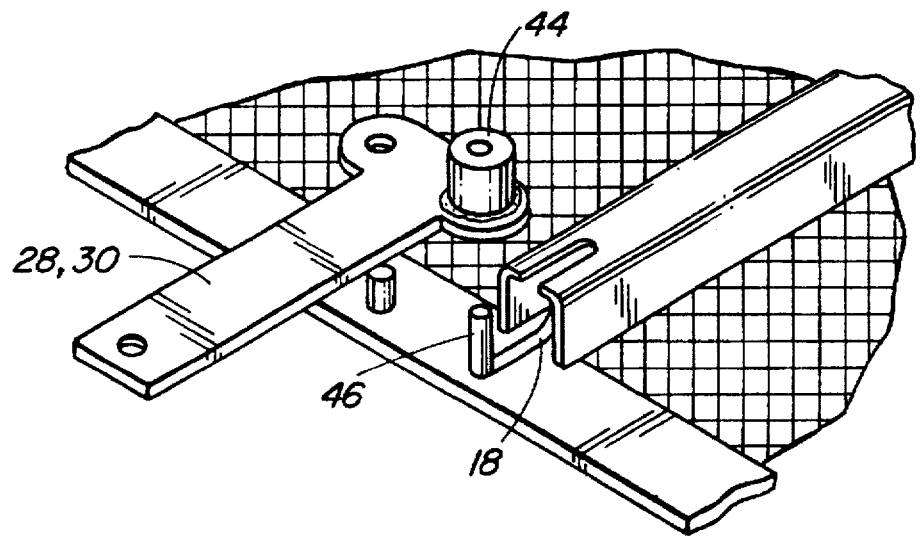
FIG. 3 is a perspective view of a connecting arm indicating its manner of mounting to the screen frame.
Figure 4:
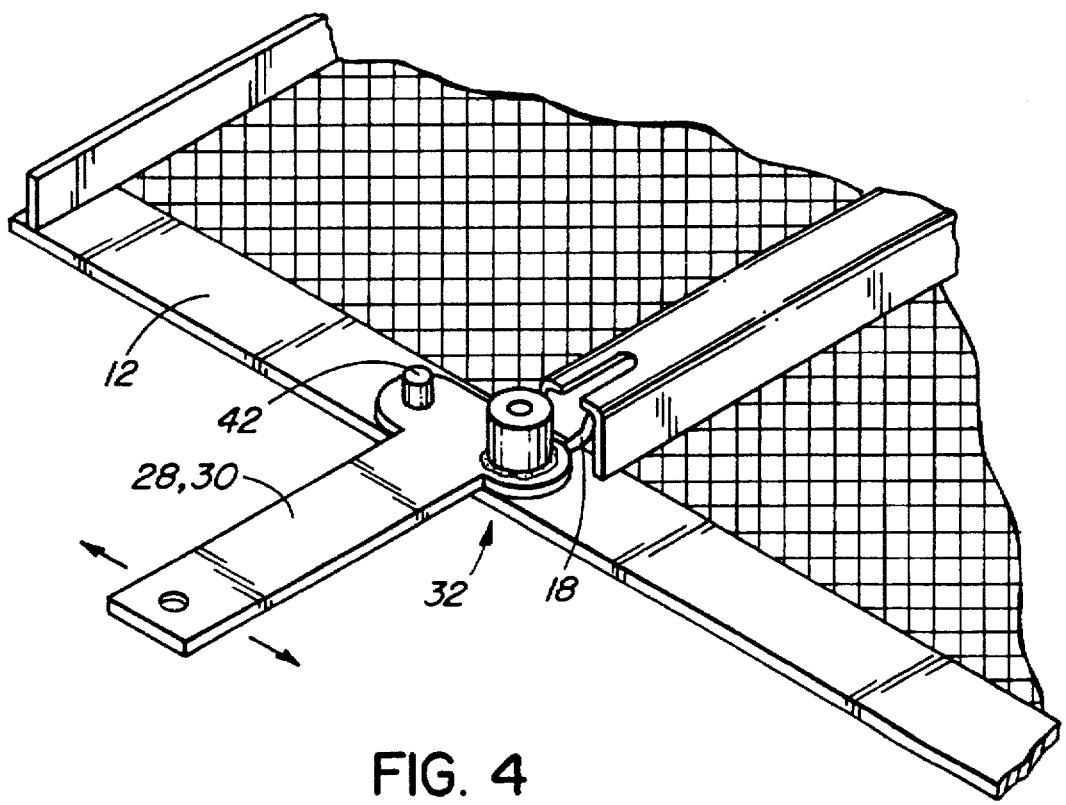
FIG. 4 is a perspective view, similar to FIG. 3, but illustrating the connecting and secured to the frame.

A pair of spaced, screen connecting arms 28, 30, shown in more detail in FIGS. 3 and 4, are each pivotally secured to the screen frame 12 and each arm 28, 30 has an inner end portion 32 that is interconnected to the screen actuators 18 in a manner to be described with respect to FIGS. 3 and 4.

FIGS. 1 and 2 illustrate the handle 22 being interconnected to the arms 28 and 30 by means of a pair of tie bars 36 each having a clevis 38 at each of its ends and the clevises at the inner ends of the tie bars are pivotally connected to the handle 22 and at the outer ends of the tie bars are pivotally connected to the arms 28 and 30.

A setting scale 40 is mounted on a suitable location on the combine adjacent the handle 22 and is provided with a series of graduations, not shown, to indicate to the operator the amount of opening or closing that is being accomplished when the handle 23 is operated.

FIG. 2 shows the handle 22 being moved in one direction with the position of movement being indicated in phantom line. It will be observed that the inner end 32 of each of the arms 28 and 30 are moved inwardly in the direction of the arrows thereby affecting inward movement of the actuators 18 and changing the opening of the screens.

FIGS. 3 and 4 are enlarged views of the connecting arms 28 and 30 and there means of attachment to the frame 12.

It will be observed that arms 28, 30 may be either T-shaped or L-shaped but in either form, the inner end of the arm is provided with a pivotal connection 42 to the frame 12 which allows arm 28 and 30 to move backward or forward in the direction of the arrows shown in FIG. 4. The inner end of the arm also includes a cylindrical cap 44 which, as shown in FIG. 3, is located over a pin 46 which is secured to the end of the actuator 18.

It will be appreciated from a consideration of FIG. 2 as well as FIG. 4, that when the actuating handle 22 is moved forward or backward, the arms 28, 30 swing about their pivots 42 so that cylindrical cap 44 and its associated pin 46 are moved inwardly or outwardly together with the actuator 18 to open or close the screens 14 and 16 simultaneously.

Figure 5:
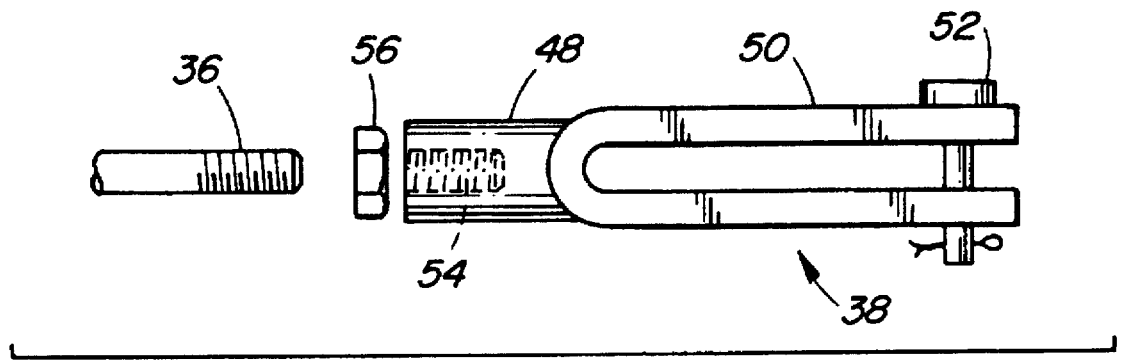
FIG. 5 is a side elevation view of a clevis used to connect the connecting arms with the actuating handle of the apparatus.

FIG. 5 is an elevation view of one of the clevises 38 and which has a body portion 48 and a pair of spaced legs 50 which are adapted to overlie the outer end of the actuating arms 28 and 30 that are pivotally secured thereto by means of a suitable pivot pin 52. The other end of the clevis 48 is provided with a threaded socket 54 to receive threaded ends of the tie bars 36 which are secured therein by means of lock nuts 56.

It will be appreciated that while the invention is illustrated using a generally centrally located operating handle 22 interconnected to a pair of arms 28 and 30, the apparatus could also be constructed wherein the handle 22 would form part of one of the connecting arms, say 28, and be connected to the other arm 30 by a single tie bar.

Additionally, while the invention is illustrated in a situation using a pair of side-by-side screens it will be appreciated that in large combines possibly three or more screens could be utilized and similarly interconnected for simultaneous adjustment.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

The embodiments of the invention in which an exclusive property or privilege is claimed are defined as follows:

1. Apparatus for simultaneously adjusting a plurality of side-by-side individually actuable screens in a combine, said screens being frame mounted and actuable between open and closed positions; said apparatus comprising:

an operating handle pivotally mounted to said frame and extending outwardly of a cleaning area of said combine;

a plurality of spaced, screen connecting arms, one end of each arm being linked to a respective one of said screens; and at least one tie bar pivotally interconnecting other ends of said connecting arms with said operating handle whereby pivoting movement of said handle with respect to said frame effects simultaneous adjustment of said screens.

2. Apparatus according to claim 1 including a graduation scale associated with said handle to provide indication of screen adjustment.

3. Apparatus according to claim 1 wherein a plurality of tie bars pivotally interconnect the other ends of said connecting arms with said operating handle.

4. Apparatus according to claim 1 wherein each arm is pivotally mounted to said frame near said one end of the arm.

5. Apparatus according to claim 4 wherein the one end of each arm is linked to the respective one of said screens by a respective individual screen actuator.

6. Apparatus according to claim 5 wherein said plurality of side-by-side screens comprises a pair of screens, and said plurality of spaced, screen connecting arms comprises a pair of arms.

7. Apparatus for simultaneously adjusting a plurality of side-by-side screens in a combine, said screens being frame mounted and moveable between open and closed positions; said apparatus comprising:

an operating handle pivotally mounted to said frame and extending outwardly of a cleaning area of said combine;

a plurality of spaced screen connecting arms, one linked to each screen; and at least one tie bar pivotally interconnecting free ends of said connecting arms with said operating handle and wherein said operating handle constitutes one of said screen connecting arms, whereby movement of said handle effects movement of said screens.

* * * * *